(No Model.) 6 Sheets—Sheet 1.
G. E. HART.
WATCH.

No. 418,128. Patented Dec. 24, 1889.

Witnesses:
Jas. E. Hutchinson.
Henry C. Hazard.

Inventor.
Geo. E. Hart, by
Brindle & Russell, his Attys.

(No Model.) 6 Sheets—Sheet 2.

G. E. HART.
WATCH.

No. 418,128. Patented Dec. 24, 1889.

Witnesses:
Jas. E. Hutchinson.
Henry C. Hazard.

Inventor.
Geo. E. Hart, by
Prindle and Russell, his Attys (No Model.) 6 Sheets—Sheet 3.
G. E. HART.
WATCH.
No. 418,128. Patented Dec. 24, 1889.
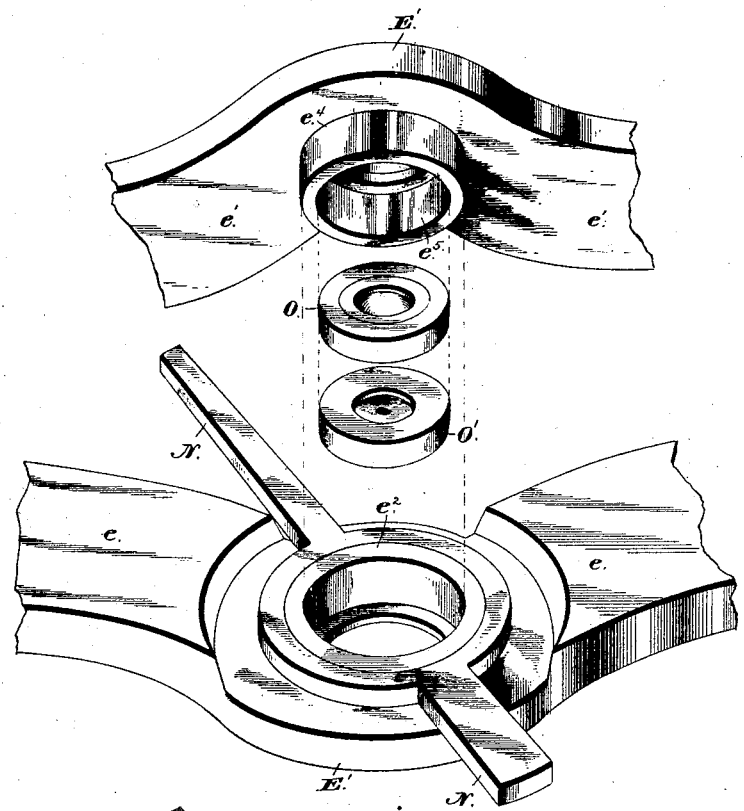
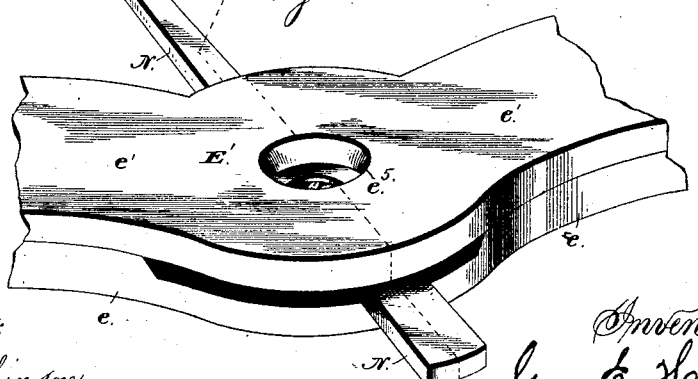

(No Model.) 6 Sheets—Sheet 4.
G. E. HART.
WATCH.

No. 418,128. Patented Dec. 24, 1889.

Witnesses:
Jas. E. Hutchinson.
Henry C. Hazard.

Inventor
Geo. E. Hart, by
Prindle and Russell, his Attys (No Model.) 6 Sheets—Sheet 5.
G. E. HART.
WATCH.

No. 418,128. Patented Dec. 24, 1889.

Witnesses:
Jas. E. Hutchinson.
Henry C. Hazard.

Inventor.
Geo. E. Hart, by
Crindle and Russell, his Atty's (No Model.) 6 Sheets—Sheet 6.
G. E. HART.
WATCH.
No. 418,128. Patented Dec. 24, 1889.
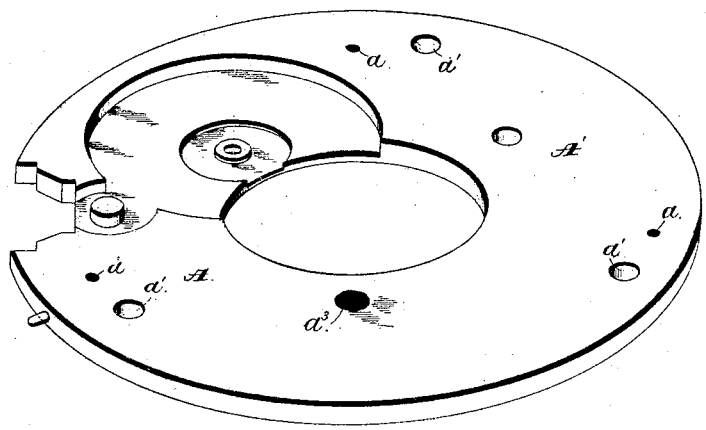
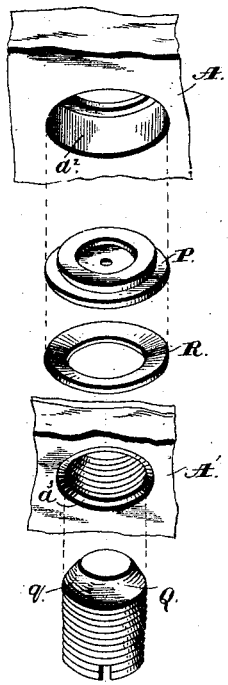
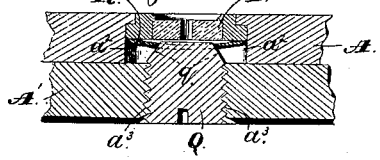
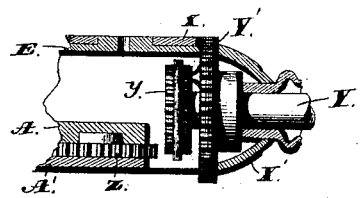
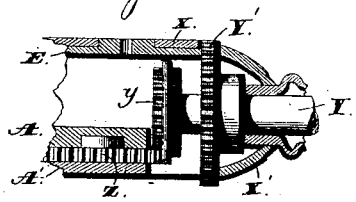
Witnesses:
Jas. E. Hutchinson.
Henry C. Hazard.
Inventor.
Geo. E. Hart, by
Prindle & Russell, his Attys.
N. PETERS. Photo-Lithographer, Washington, D. C.

United States Patent Office.

GEORGE E. HART, OF WATERBURY, CONNECTICUT, ASSIGNOR TO THE WATERBURY WATCH COMPANY, OF SAME PLACE.

WATCH.

SPECIFICATION forming part of Letters Patent No. 418,128, dated December 24, 1889.

Application filed October 7, 1887. Renewed November 26, 1889. Serial No. 331,588. (No model.)

*To all whom it may concern:*

Be it known that I, GEORGE E. HART, of Waterbury, in the county of New Haven, and in the State of Connnecticut, have invented certain new and useful Improvements in Watches; and I do hereby declare that the following is a full, clear, and exact description thereof, reference being had to the accompanying drawings, in which—

Figure 1:
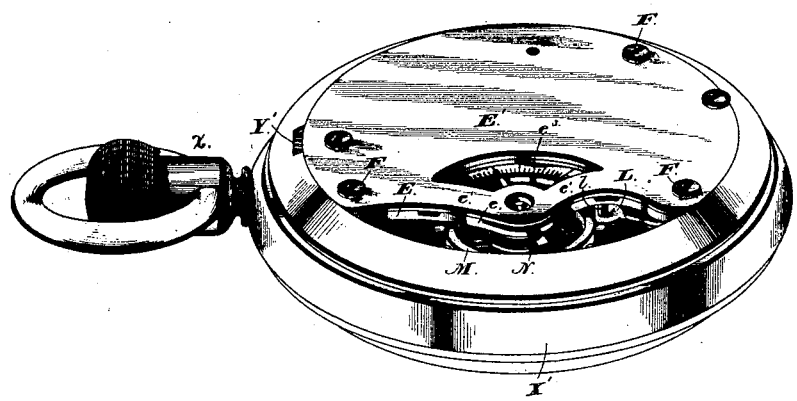
Figure 2:
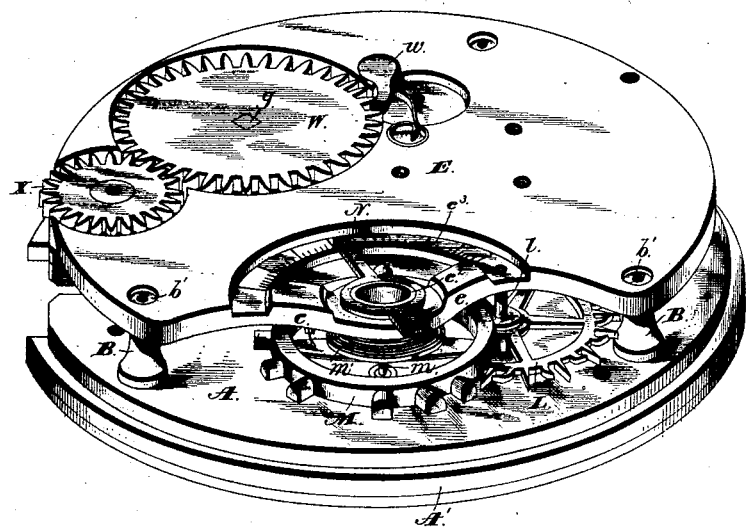
Figure 3:
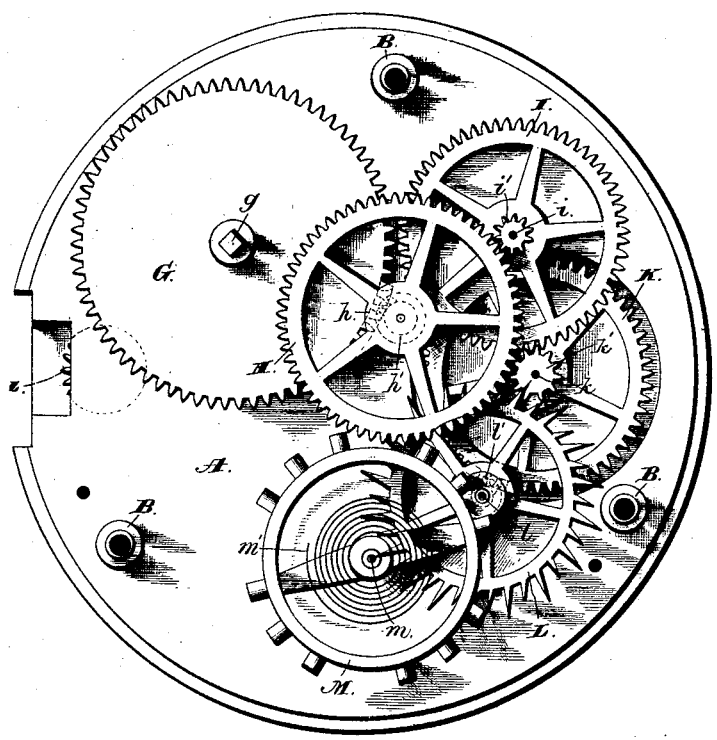
Figure 4:
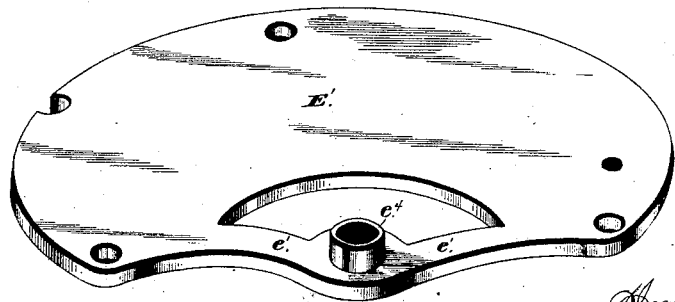
Figure 7:
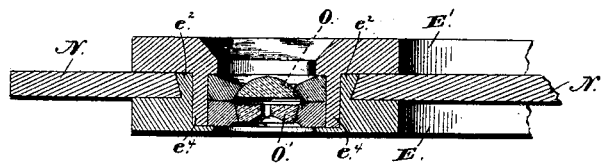
Figure 8:
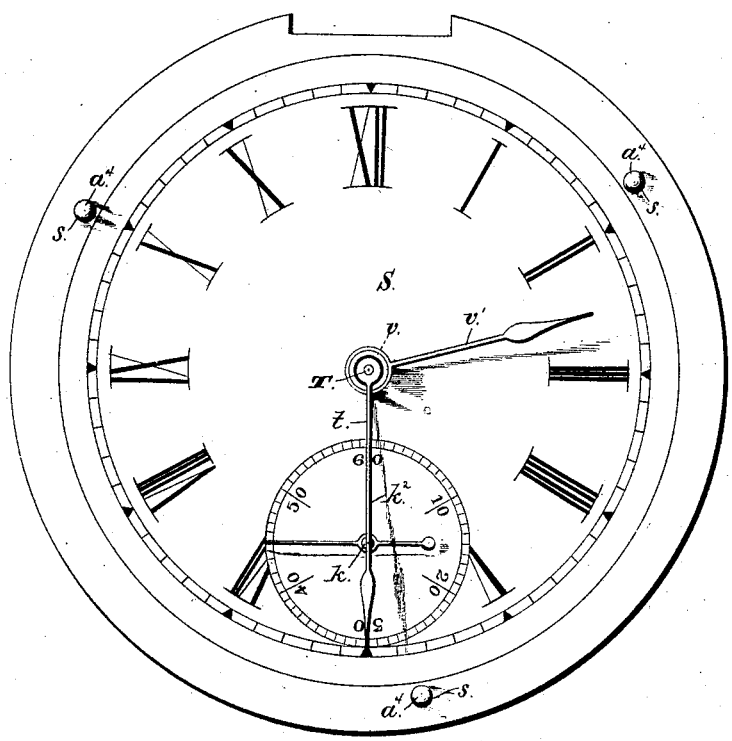
Figure 9:
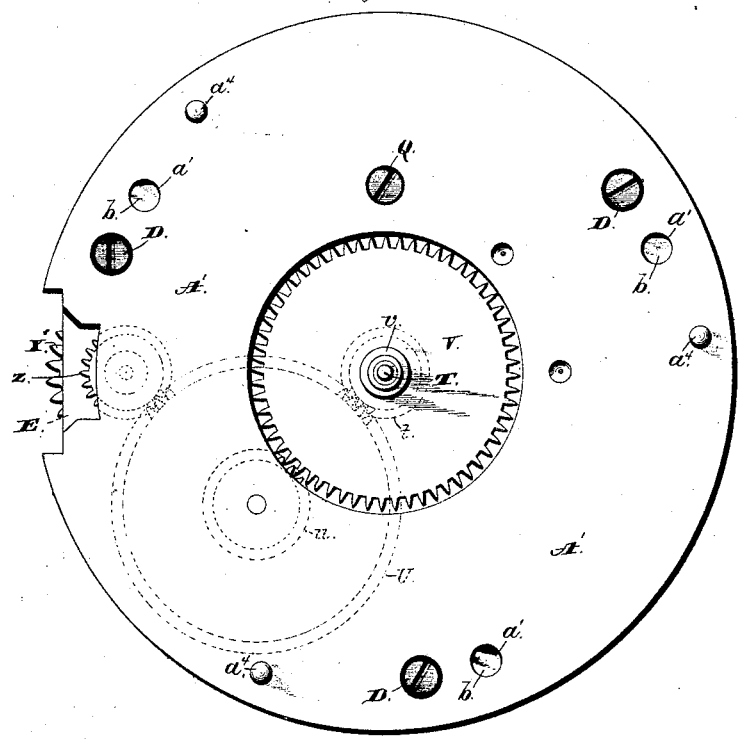
Figure 10:
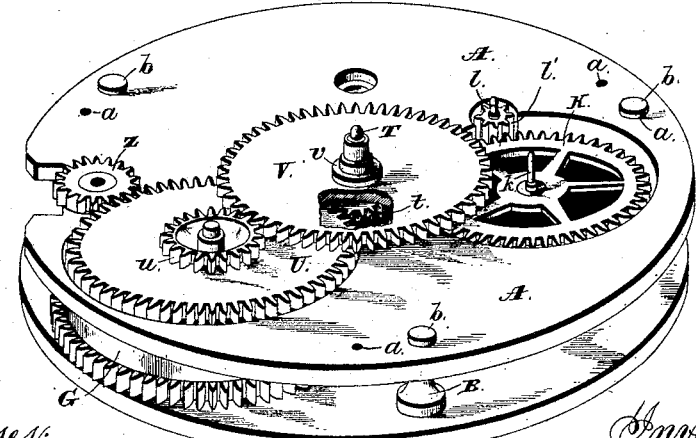

Figure 1 is a perspective view of my watch from the back side, the case-back being removed. Fig. 2 is an enlarged perspective view of the movement from the rear, separated from the case and having the outer section of the back plate removed. Fig. 3 is a plan view of the same with the entire back plate removed. Fig. 4 is a perspective view of the inner face of the outer section of the back plate. Fig. 5 is a perspective view, enlarged, of the portions of the back plate which constitute the balance-bridge, together with the regulator and the balance-staff jewels separated from each other. Fig. 6 is a like view of the same united. Fig. 7 is a section upon line $x\,x$ of Fig. 6. Fig. 8 is a plan view of the face side of the movement. Fig. 9 is a like view of the same with the dial removed. Fig. 10 is a perspective view of said movement with the outer section of the front plate removed. Fig. 11 is a like view of said outer plate-section from the inner side. Fig. 12 is an enlarged perspective view of the jewel for one end of the balance-staff, the end-shake mechanism, and the portions of the front plate sections which contain the same, said parts being separated from each other. Fig. 13 is a cross-section of the same when united; and Figs. 14 and 15 are longitudinal sections of the pendant, and show, respectively, the stem-arbor in its normal condition in engagement with the winding-train and when in engagement with the hands-setting train.

Letters of like name and kind refer to like parts in each of the figures.

The design of my invention is to increase the efficiency of watch-movements; and to this end it consists, principally, in the time-train constituted and combined substantially as and for the purpose hereinafter specified.

It consists, further, in the means employed for communicating the motion of the train to the hands, substantially as and for the purpose hereinafter shown.

It consists, further, in the means employed for confining the regulator and balance-staff jewels in place, substantially as and for the purpose hereinafter set forth.

It consists, further, in the means employed for holding the lower balance-arbor jewel in place and adjusting the end-shake of said arbor, substantially as and for the purpose hereinafter shown and described.

It consists, finally, in details of construction, substantially as and for the purpose hereinafter specified.

In the construction of my watch I employ a front movement-plate which is composed of a stationary inner section A, to which are secured the usual pillars B and B, and an outer detachable section A', that fits upon the outer face of said section A and is secured in place thereon by means of screws D, that pass through said section A' and have their threaded ends contained within correspondingly-threaded openings $a$ and $a$ in said inner section. The projecting ends $b$ and $b$ of said pillars B and B fit into corresponding openings $a'$ and $a'$ in said outer section and operate as steady-pins for the latter.

Fitting over the ends $b'$ and $b'$ of the pillars B and B, opposite to the front plate described, is a back plate, which is also composed of an inner section E and an outer section E', that fit together in substantially the same manner as do the sections of said front plate, and are held in place upon the ends of said pillars by means of screws F and F, which pass through said sections E and E' and have their threaded ends contained within threaded axial openings in said pillar ends $b'$ and $b'$.

Between the inner sections A and E of the movement-plates is contained a time-train, which consists of a going-barrel G and arbor $g$, a second wheel H, with its arbor $h$ and pinion $h'$, a third wheel I, provided with an arbor $i$ and pinion $i'$, a fourth wheel K, with its arbor $k$ and pinion $k'$, a duplex escape-wheel L, having an arbor $l$ and pinion $l'$, and a balance-wheel M, provided with an arbor $m$ and hair-spring $m'$, which parts are arranged around the center of the movement, as shown in Fig. 3, but are none of them located at the axis of the same.

The sections of the back plate are cut away upon the side of the movement at which the balance-wheel M is located, so as to leave upon each at such point only a comparatively narrow bridge $e$ or $e'$ for the support of a regulator N and for the jewels O and O', that journal the corresponding end of the arbor $m$. Said regulator is journaled upon a hollow hub $e^2$, that is formed upon the outer face of the bridge $e$ of the inner section and has its end extended over a scale $e^3$, which is provided upon the face of or within a recess in said section. The bridge $e'$ of the outer section is provided upon its inner face with a hub $e^4$, which has an axial opening $e^5$, that is adapted to receive and contain the jewels O and O', with their settings, while exteriorly said hub is adapted to fit within the axial opening of the hub $e^2$, so that when said plate-sections are combined they present the appearance shown in Fig. 7, said jewels being in the same position which they would occupy if the back plate were solid and the regulator N being held between the inner faces of the bridge-sections. This method of setting the jewels for the rear end of the balance-wheel arbor enables them to be placed in or removed from position without disturbing the balance-wheel or taking down any portion of the movement except the outer section of the back plate.

The front end of the balance-wheel arbor $m$ is pivoted within a jewel P, which is contained in a suitable opening $a^2$, that is formed in the inner section A of the front plate. The inner end of said opening is shouldered in the usual manner to furnish a bearing for said jewel, while within the outer section A' is a coinciding threaded opening $a^3$, that receives a screw Q, which has its inner end $q$ chamfered or beveled, as shown. Between the jewel P and screw Q is placed a convex ring of metal R, which is arranged with the concave face adjacent to the former and its outer edge bearing upon the outer face at or near the periphery of the same, while its central opening receives and contains the beveled end $q$ of said screw. The screw Q is used for an end bearing for the arbor $m$, and by turning the former inward or outward any desired amount of end-shake may be given to said arbor. The metal ring R operates to hold the jewel P in place at the bottom of the opening $a^2$, and in consequence of its concave form acts as a spring and yields more or less as said screw is moved longitudinally, the tapering end $q$ of the latter having such diameter with relation to the opening in said ring as to cause it to engage with and move the inner portion of the latter inward when screwed in such direction, while when said screw is turned outward the spring of said ring will cause it to maintain a bearing upon said screw within the limits of motion necessary for the regulation of the end-shake.

Upon removing said screw said ring or spring-washer and said jewel are left free to be removed from their opening $a^2$.

The dial S is placed upon the front plate and held in position thereon by means of steady-pins $a^4$ and $a^4$, which project from the outer section A' into corresponding openings $s$ and $s$, that are provided in said dial. Within said dial and the inner section A is journaled an arbor T, that has a pinion $t$, which meshes with and receives motion from a wheel U, that is journaled upon a hub that is provided upon the front end of the spring-barrel G and is rotated thereby by friction.

Upon the arbor T, above the pinion $t$, is journaled a wheel V, which meshes with and receives motion from a pinion $u$, that is secured upon and rotates with the wheel U. The said wheels and pinions constitute the dial-train of the movement and have such relative proportions as to cause said pinion $t$ to revolve twelve times while said wheel V is making one revolution. The outer end of said arbor T receives and carries a minute-hand $t'$, while said wheel V is provided with a hub $v$, that projects through the dial S and receives an hour-hand $v'$.

The fourth-wheel arbor $k$ is adapted to make one revolution each minute, and upon its front end, which projects outward through the dial S, is provided with a seconds-hand $k^2$.

Upon the rear end of the mainspring-arbor $g$ is secured a winding-wheel W, which is engaged by a spring-pressed pawl $w$, that operates to prevent rearward motion of said arbor. Said winding-wheel meshes with and, as hereinafter described, receives motion from a smaller wheel X, that is journaled upon the plate-section E in such position as to cause its toothed periphery to extend slightly beyond the edge of said back plate. The movement thus constructed is contained within a watch-case center X', which is of usual construction, and is provided with a pendant $x$, that contains and journals a longitudinal stem-arbor Y. Upon the inner end of the latter is secured a pinion $y$, that, when said arbor is moved longitudinally inward, meshes with a small wheel Z, that is pivoted upon the front plate A and is in constant engagement with the dial-wheel U, by which arrangement the latter may be rotated by the turning of said stem-arbor, so as to enable the hands of the movement to be set. A second pinion Y' is loosely journaled upon the stem-arbor Y in such position as to cause it to be in constant engagement with the wheel X, and by means of a spring-pawl of usual form is adapted to be connected with and rotated by said stem-arbor when the same is at the rear limit of its longitudinal motion and the pinion $y$ is out of engagement with the dial-wheels, in which position, by the rotation of said stem-arbor, the mainspring-arbor will be rotated, while when the stem-arbor is moved longitudinally inward, so as to cause said pinion $y$ to engage with the dial-wheels, said winding-pinion y' will be automatically disengaged from and cease to be rotated by said stem-arbor. A spring coiled around the stem-arbor within the pendant holds the former with a yielding pressure at the outer limit of its motion when it is in position to wind the mainspring, but not to turn the hands.

Having thus described my invention, what I claim is—

1. A watch-movement having a time-train which is composed of a going-barrel and arbor, a second-wheel arbor and pinion, a third wheel provided with an arbor and pinion, a fourth wheel having an arbor and pinion and arranged to rotate once each minute, a duplex escape-wheel arbor and pinion, and a balance-wheel and arbor, said parts being combined substantially as and for the purpose specified.

2. In a time-piece, the combination of a balance-wheel and arbor, a duplex escape-wheel arbor and pinion, a fourth arbor carrying a seconds-hand and having a wheel and pinion, a third-wheel arbor and pinion, a second wheel provided with a pinion and arbor, a spring barrel and arbor, a toothed wheel upon the spring-barrel, and dial-wheels which engage with and receive motion from said spring-barrel toothed wheel, substantially as and for the purpose shown.

3. A watch-movement in which one of the dial-wheels and its pinion is journaled upon and receives motion from the spring-barrel, substantially as and for the purpose set forth.

4. As an improvement in watches, a movement-plate composed of two flat sections which are adapted to be secured together with their inner faces in contact, and one of the same is provided with a round hub that is formed upon and integral with the same, in combination with each other and with a regulator that is journaled upon such hub and projects from between said sections, substantially as and for the purpose shown and described.

5. As an improvement in watches, a movement-plate that is composed of two superimposed separable sections, the outer of which sections is provided with a hollow hub that projects into or through an opening in the inner section, in combination with each other and with jewels which are secured within and contained by such hollow hub, substantially as and for the purpose specified.

6. As an improvement in watches, the combination of a jewel which is fitted loosely into a recessed opening in a movement-plate, an end-shake screw that is arranged axially in a line with the axis of the jewel, and an annular spring-washer which is interposed between the outer end of said jewel and the inner end of said screw, substantially as and for the purpose set forth.

7. As an improvement in watches, the combination of a jewel which is fitted loosely into a recessed opening in a movement-plate, an end-shake screw that has a tapered inner end and is arranged axially in a line with the axis of the jewel, and an annular spring-washer which is interposed between the outer end of said jewel and the inner portion of said screw, substantially as and for the purpose specified.

8. As an improvement in watches, a movement-plate that is composed of two superimposed separable sections, one of which is provided with a recess for the reception of a staff-jewel and the other section has a coinciding threaded opening, in combination with each other and with a screw that is fitted to and contained within such threaded opening, substantially as and for the purpose shown.

9. As an improvement in watches, the combination of a movement-plate that is composed of two superimposed separable sections, one of which is provided with a recess for the reception of a jewel and the other section has a coinciding threaded opening, a screw that is fitted to and adapted to be moved longitudinally within such threaded opening, and a spring-washer which is interposed between the inner end of said screw and the outer end of said jewel outside of its pivot-opening, substantially as and for the purpose set forth.

In testimony that I claim the foregoing I have hereunto set my hand this 5th day of August, 1887.

GEORGE E. HART.

Witnesses:
GEO. S. PRINDLE,
E. L. BRONSON.